Figure 2A:
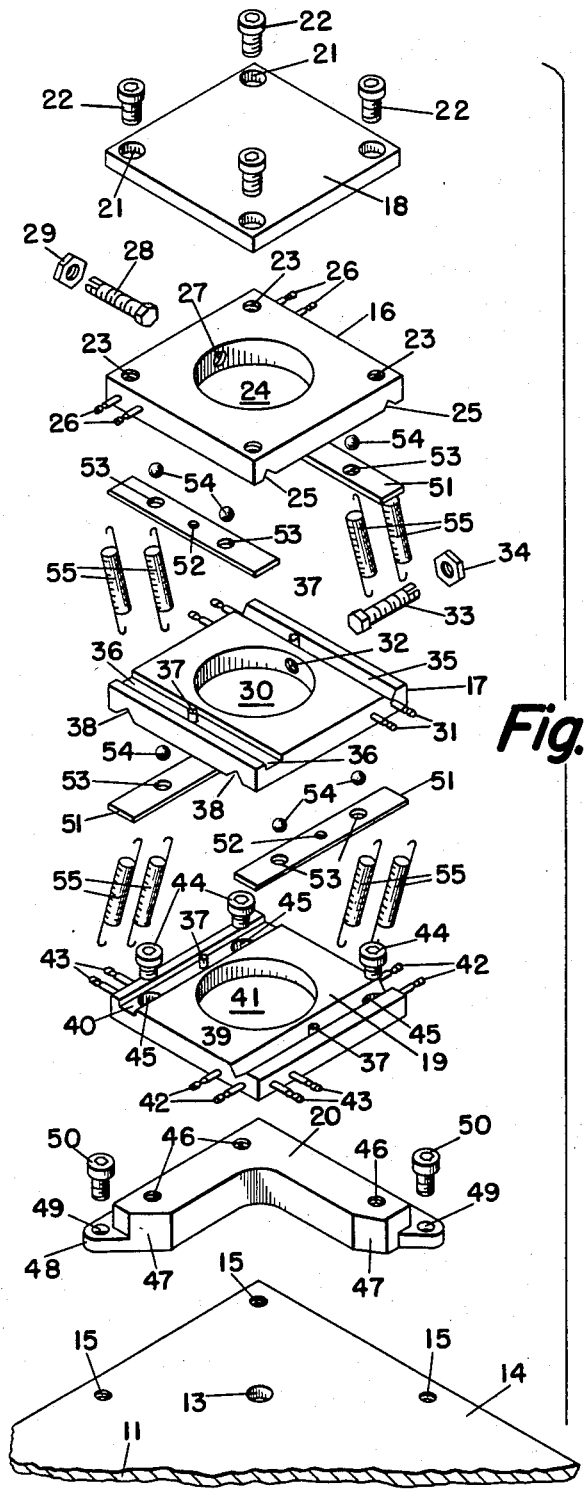

Oct. 31, 1961
M. M. BYCER ET AL
3,006,245
PANTOGRAPH TYPE MICRO-POSITIONER
Filed March 28, 1960
2 Sheets-Sheet 1
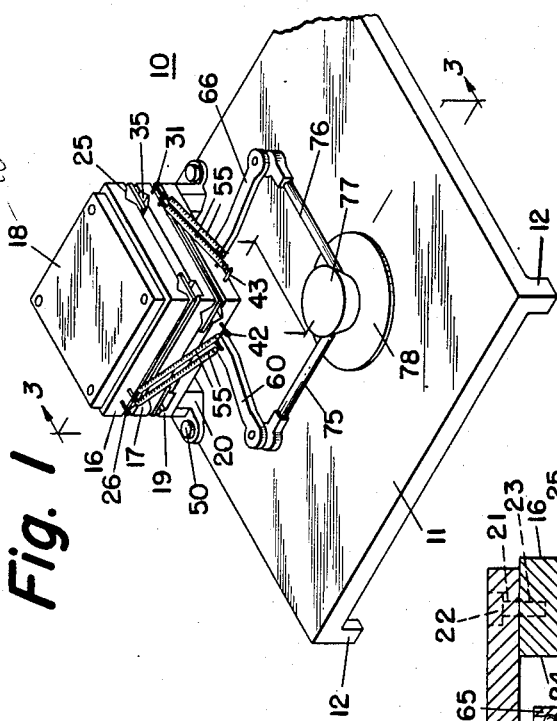
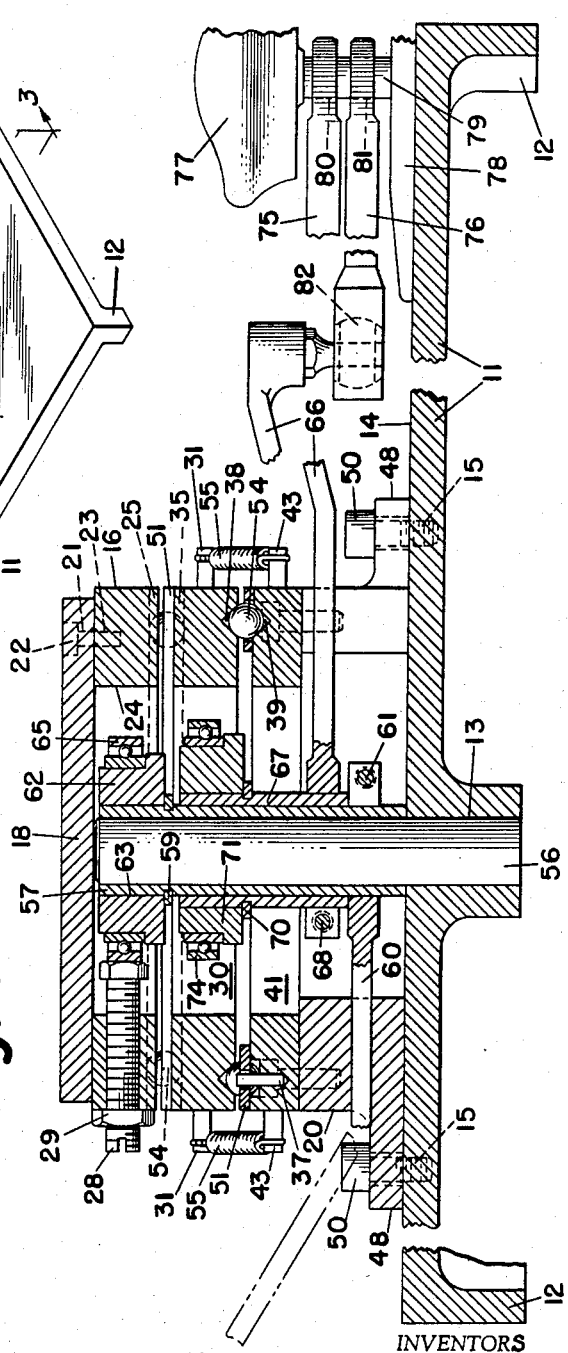
INVENTORS
MANUEL M. BYCER
FREDERICK W. KULICKE JR.
BY
Bilker & Moyerman
ATTORNEYS Oct. 31, 1961   M. M. BYCER ET AL   3,006,245
PANTOGRAPH TYPE MICRO-POSITIONER
Filed March 28, 1960   2 Sheets-Sheet 2

INVENTORS
MANUEL M. BYCER
FREDERICK W. KULICKE JR.
BY
Silker & Moyerman
ATTORNEYS

United States Patent Office 3,006,245
Patented Oct. 31, 1961

3,006,245
PANTOGRAPH TYPE MICRO-POSITIONER
Manuel M. Bycer, Upper Darby, and Frederick W. Kulicke, Jr., Philadelphia, Pa., assignors to Kulicke & Soffa Mfg. Co., Philadelphia, Pa., a corporation of Pennsylvania
Filed Mar. 28, 1960, Ser. No. 17,883
8 Claims. (Cl. 88—40)

This invention relates to a pantograph operated micro-positioner. More particularly, it relates to a horizontally positionable work table which is moved through extremely small distances along vectors having X and/or Y components by a pantograph lever system.

In modern technology there is frequent need for horizontal work stages or tables which can be moved for small distances, in a positively controlled manner (i.e. with minimal play), along an X axis, a Y axis, or a vector containing both X and Y components. Such devices will be referred to herein as "micro-positioners."

Thus, for instance, assembly of semi-conductor elements is often done under a microscope with work resting upon a stage which must be moved in a horizontal plane during assembly. Similar applications exist in metallurgy and in baceteriology. In all of these applications, objects must be accurately positioned in a horizontal plane and the changes in position are often so small that they are only apparent by microscopic observation. It is, therefore, highly desirable that the work table be capable of positioning by the operator while continuous observations are being made through a microscope. Furthermore, it is often necessary that the operator have one free hand, even during such positioning operation, for use in connection with assembly of components, dye application, staining and the like.

Prior high precision micro-positioners required such extremely close tolerances in the fitting of their components and assemblies as to make the costs thereof prohibitive. Furthermore, former designs, in utilizing fine tolerances, close fittings and screw pressure pre-loading, made these manipulators particularly vulnerable to irreparable permanent damage as a result of accidental shock or extremes of temperature and, at the very least, in need of constant readjustment and re-alignment.

Accordingly, it is an object of this invention to provide a work table which is positionable along X and Y axes or vectors thereof in a positively controlled manner.

A further object of the invention is to provide a work table or platform which is horizontally positionable in two directions or resultants thereof by motion of a single handle or knob.

An additional object of the invention is to provide a horizontal micro-positioner which utilizes a pantograph type arrangement of operating levers wherein the ratio of pantograph motion to work table motion is greater than unity.

Still another object of the invention is to provide a horizontal micro-positioner which includes indicia for returning the work table to any predetermined position.

A further object of the invention is to provide a subminiature positioning device which, during manipulation, will insure a steady, measured movement with minimum friction and without backlash or play.

Other objects of the invention are to provide an improved device of the character described which is sturdy in construction, economical to produce and highly efficient in operation.

These and other objects of the invention will be apparent, to those skilled in the art, from a consideration of the specification and claims which follow.

In the drawings, wherein like numerals indicate like parts:

FIGURE 1 represents a perspective view of an assembled micro-positioner embodying the invention.

Figure 2B:
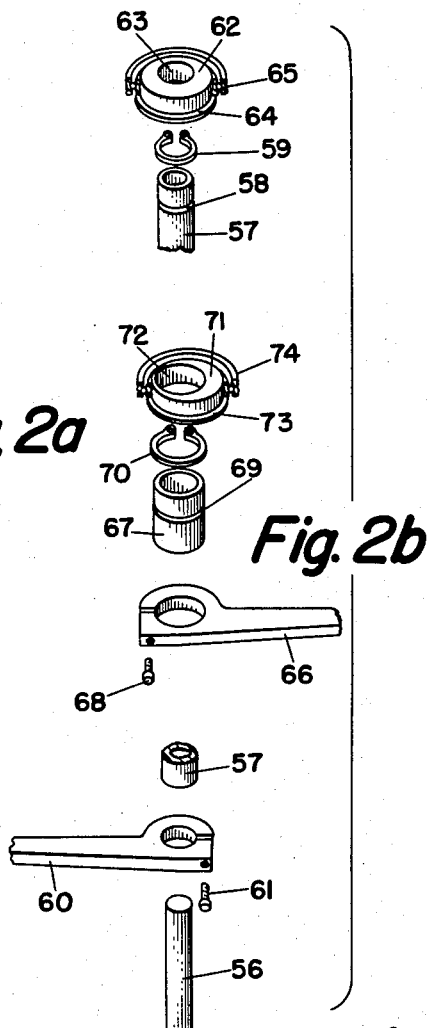

FIGURE 2–A represents an exploded view of the non-rotating components of the device shown in FIGURE 1.

FIGURE 2–B represents an exploded view, partially in section, of the rotating components of the device shown in FIGURE 1 and the individual parts are in approximate horizontal alignment with those parts shown in FIGURE 2–A with which they are operatively associated after assembly of the device.

FIGURE 3 represents a partial modified cross-sectional view taken primarily along 3—3 of FIGURE 1.

Referring now to the drawings, the micro-positioner shown in FIGURE 1 is generally referred to as 10. It includes a rectangular main base 11, having legs 12, a mounting aperture 13 (best seen in FIGURE 2–A) in one quadrant thereof, a smooth horizontal surface 14, and a plurality of drilled and tapped holes 15 located in the same quadrant as mounting aperture 13.

The micro-positioner further includes a first stage or X-stage slider 16. This slider is capable of horizontal motion in only one direction (i.e. along an axis which may be arbitrarily referred to as an X axis) in a plane parallel to the plane of the surface 14. A second stage or Y-stage slider 17 is similarly capable of horizontal motion in only one direction in a plane parallel to the plane of the surface 14, but this direction is along an axis angularly removed (e.g. 90°) from the aforementioned X axis and will, accordingly, be considered a Y axis.

A top plate or work table 18 is permanently mounted on the X-stage or first stage slider 16. The first stage slider 16 is slideably mounted on the second stage slider 17. The second stage slider 17 is, in turn, slideably mounted on a bearing holder or baseway 19. The baseway, in turn, is fixedly mounted on a generally L-shaped angular base way support 20. Baseway support 20 is fixedly mounted on main base 11. All of the components discussed in this paragraph may be generally characterized as non-rotating and details of their assembly, as best shown in FIGURE 2–A, will now be discussed.

Top plate or work table 18 contains a plurality of holes 21 adapted to receive set screws 22. The X-stage slider 16 also contains a plurality of holes 23, drilled and tapped to receive and retain screws 22 and adapted for vertical alignment with holes 21. Top plate 18 is mounted on the X-stage slider 16 with screws 22 as is apparent from the drawing. Other equally suitable means may, of course, be used for mounting the top plate on the first stage slider.

The X-stage or first stage slider 16 includes a large, generally circular, internal bore 24 and is provided on its underside with two parallel V-grooves 25. On opposite edges of slider 16 are mounted a plurality of spring hangers 26 which, as will be explained subsequently, cooperate with similar spring hangers mounted on the bearing holder or baseway 19. Finally, slider 16 is provided with a drilled and tapped hole 27 extending radially from one edge of the slider to the perimeter of bore 24. Hole 27 is threaded internally and is adapted to receive the first stage adjusting screw 28. Screw 28 has, associated with it, nut 29 which functions to retain the screw in any set position.

The Y-stage or second stage slider 17, is similarly constructed and includes internal bore 30, spring hangers 31, drilled and tapped hole 32, a second stage adjusting screw 33 and nut 34. However, both the upper and lower horizontal surfaces of slider 17 are grooved. The upper surface is preferably provided with one V-groove 35 and one groove 36 having a generally flattened U-shaped cross section. When slider 16 is placed upon slider 17, the grooves 25 will be in longitudinal axial alignment with the grooves 35 and 36. At approximately the transverse center-line of grooves 35 and 36 are located retainer pins 37. In the case of groove 36, the pin is placed in the flat bight of the U; in the case of the groove 35, the pin is placed at the vertex of the V. The underside of slider 17, as has been stated, is also provided with parallel spaced-apart grooves, on each side of the internal bore 30 and, as shown in FIG. 2–A, these grooves 38 have, preferably, a generally V-shaped cross section. The longitudinal center line of these grooves is angularly displaced from the longitudinal center lines of grooves 35 and 36 by, preferably, about 90° although any angle may be used depending upon the angular relationship desired between what has been termed the X and Y axes of the micro-positioner.

Beneath slider 17 is positioned baseway or bearing holder 19. This piece has no motion relative to baseway support 20 or main base 11. Its upper surface is preferably provided with one groove 39, having a generally V-shaped cross section and one groove 40, having a generally flattened U-shaped cross section. These grooves are in parallel spaced-apart relationship and are adapted to be aligned with grooves 38. These grooves are also provided with retaining pins 37 in the same manner as are grooves 35 and 36. Baseway 19 is also provided with an internal bore 41 and a plurality of pairs of spring hangers 42, preferably a pair on each edge thereof as shown in FIG. 2–A. Paired spring hangers 42 are located on opposite edges of baseway 19 in the same vertical planes as spring hangers 26, and are located diagonally remote from hangers 26 with which they are adapted to cooperate. Similarly, paired spring hangers 43 are located in the same vertical planes as spring hangers 31, with which they cooperate. Baseway 19 is secured to the generally L-shaped baseway support 20 with screws 44, which are countersunk in holes 45, said holes being located in the flat bight of generally U-shaped groove 40 and at the vertex of V-shaped groove 39.

Baseway support 20 is provided with drilled and tapped holes 46 to receive screws 44. The baseway support also includes vertical stop faces 47 and fastening ears 48, the latter containing holes 49. Holes 49 are adapted to be vertically aligned with holes 15 and to receive screws 50, the function of which is to secure baseway support 20 to main base 11.

The sliding stages (i.e. X-stage 16 and Y-stage 17) are separated from each other and from baseway 19 by the use of foraminous separators 51. These separators are thin pieces of metal having a generally rectangular shape. Each contains a small hole 52, which is slightly larger in diameter than the diameter of retainer pins 37, said small hole being preferably centered, transversely and longitudinally. The separators 51 also contain a plurality of larger holes 53, the diameter of which is preferably slightly larger than the diameter of steel ball bearings 54. Separators 51 are adapted to be placed over the various grooves (e.g. 35, 36, 39, 40, etc.) and to be retained in a relatively fixed position by pins 37. Ball bearings 54 are, in turn, adapted to be retained in holes 53.

Considering now the assembly of the non-rotating components shown in FIGURE 2–A, it will be apparent that assembly may be accomplished, for illustrative purposes, as follows: Place baseway support 20 upon base 11 so that holes 49 are in registration with holes 15. Insert and tighten screws 50. Place bearing holder or baseway 19 upon baseway support 20 so that holes 45 are in registration with holes 46 and assemble with screws 44. Place a separator 51 over groove 40 and another over groove 39 in alignment therewith so that pins 37 extend upward through holes 52. Place a steel ball bearing 54 in each of holes 53. Thereafter, place Y-stage slider 17 upon baseway 19 so that the upper portions of ball bearings 54 are in contact with grooves 38 and support the slider.

It should be noted that the flat surfaces of generally U-shaped groove 48 make this assembly easier than were all four cooperating grooves V-shaped and allow for larger machining tolerances. Furthermore, the provision of lateral freedom for one row of ball bearings 54, as by grooves 36 and 40, compensates for temperature effects and obviates the necessity for frequent adjustment.

Conveniently, screw 33 may be preassembled in drilled and tapped hole 32 from the bore side and nut 34 placed upon the end thereof. Screw 28 can be similarly preassembled in X-stage slider 16. Additional separators 51 are now placed over grooves 35 and 36 so that pins 37 extend upwardly into holes 52. Ball bearings 54 are placed in holes 53 and X-stage slider 16 placed upon Y-stage slider 17 so that the upper portions of ball bearings 54 are in contact with grooves 25 and support the X-stage slider 16. Top plate 18 may now be secured to X-stage slider 16 with screws 22 or this may have been done as a preassembly.

Finally, biasing springs 55 are connected to the various spring hangers to resiliently urge the sliders downward. As shown in FIGURE 1, one spring 55 connects each spring hanger 42 (on baseway 19) with each spring hanger 26 (on X-stage slider 16) thus holding the assembly together vertically and also horizontally biasing slider 16. In a similar manner, one spring 55 connects each spring hanger 43 (on baseway 19) with each spring hanger 31 (on Y-stage slider 17) thus urging slider 17 into juxtaposition with baseway 19. The various paired springs supply a resilient vertical force which holds the entire assembly together without need for fasteners (which might, upon tightening, distort the sliders and hinder their smooth, accurate motion) and serve, additionally, to horizontally bias the X and Y stage sliders. The importance of the horizontal forces exerted by the springs will be discussed below.

As previously stated, the above assembly is illustrative only and may not be the most expeditious means of assembly in view of the relationship between the non-rotating components shown in FIG. 2–A and the rotating components shown in FIG. 2–B.

Considering now the rotating components shown in FIGURE 2–B, we note that they are all assembled on or about a central dowel pin 56. This pin has a diameter such that it may be pressed into mounting aperture 13 and is long enough to extend substantially to the underside of top plate 18. A first stage sleeve or bushing 57, which has an inside diameter slightly larger than the outside diameter of dowel pin 56, fits over the pin. The upper end of the sleeve may be notched, as at 58, so as to receive and retain first stage snap ring 59 at a fixed position. To the lower end of sleeve 57 is affixed first stage operating handle 60 which, as shown, may be of the split-yoke type, and is affixed to the sleeve 57 with clamping screw 61. At the upper end of the sleeve is provided a first stage eccentric cam 62 which includes an off-center bore 63 and a peripheral shoulder 64. The diameter of the bore 63 bears a relationship to the outside diameter of the sleeve 57 such that the cam 62 may be press-fitted onto the sleeve. Surrounding the cam 62 and abutting the shoulder 64 is a conventional annular ball bearing assembly 65 having an inner and an outer raceway.

Second stage operating handle 66 may also be of the split yoke type, secured to second stage sleeve or bushing 67 by clamping screw 68. Sleeve 67 may be notched, as at 69, to receive snap ring 70. The internal diameter of sleeve 67 is slightly larger than the outside diameter of first stage sleeve 57, about which it is mounted concentrically. At the upper end of sleeve 67 is provided a second stage eccentric cam 71, which includes an off center bore 72 and a peripheral shoulder 73. Surrounding the cam 71 and abutting the shoulder 73 is a conventional annular ball bearing assembly 74 having an inner and an outer raceway.

The rotating components shown in FIGURE 2–B may be assembled, for example, as follows: Snap ring 70 is placed in notch 69 on second stage bushing 67. Thereafter, eccentric cam 71, on which has previously been mounted bearing assembly 74, is pressed onto bushing 67 until its underside abuts ring 70. In a similar manner snap ring 59 and cam 62 are affixed to first stage bushing 57, upon which has previously been mounted ball bearing assembly 65. First stage sleeve 57 is then mounted concentrically within second stage sleeve 67, handle 66 mounted on sleeve 67 and handle 60 mounted on first stage sleeve 57. In practice, this assembly is performed concurrently with the assembly of the non-rotating members discussed above in connection with FIGURE 2-A. For overall assembly one may begin by pressing dowel pin 56 into aperture 13, thereafter assembling rotating and non-rotating members in a logical manner.

First stage operating handle 60 and second stage operating handle 66 form two sides of the pantograph operating system, as best shown in FIGURES 1 and 3. The other sides of the pantograph are formed by first stage connecting rod 75 and second stage connecting rod 76. The corner of the pantograph most remote from aperture 13 is provided with a knob 77 which is pivotally connected to circular slider plate 78 by a vertical shaft 79. The end of first stage connecting rod 75 most remote from first stage operating handle 60 (as indicated by the numeral 80), is provided with an aperture to pivotally receive, and retain, shaft 79. Second stage connecting rod 76 (as indicated by the numeral 81) is provided with a similar aperture. Connecting rods 75 and 76 are pivotally connected, respectively, to operating handles 60 and 66 with minimal play linking devices such as the conventional ball joints 82.

Slider plate 78 has a relatively large diameter and is preferably made of a material such as bronze which is adapted to slide smoothly over the surface 14. Minimal friction plastics may also be used for plate 78 and surface 14 provided that they are dimensionally stable. The size of plate 38 also prevents torque effects and enables shaft 79 to remain in a true vertical position, even while the plate is moving across surface 14. Plate 78 may include peripheral indicia and surface 14 may be ruled with coordinates or other indicia. For any predetermined registration of the indicia on 78 with the indicia on 14, the top plate 18 will always be in the same position.

Considering now the operation of the device as a whole, and referring particularly to FIGURE 3, it will be noted that in the assembled position the first stage eccentric cam 62 is located entirely within the internal bore 24 of the first stage slider 16. Slider 16 is continually urged toward the right (with reference to the orientation of FIG. 3) and downwardly, by the tension of springs 55 co-acting with paired spring hangers 26 (on slider 16) and 42 (on baseway 19). Because of the horizontal component of spring action, the head of first stage adjusting screw 28 is always in juxtaposition to the outer raceway of ball bearing assembly 55 and, because of the vertical component of spring action, slider 16 is resiliently pressed against slider 17. As first stage operating handle 60 is moved, rotary motion is imparted to first stage sleeve 57 and, in turn, to first stage eccentric cam 62 and the inner race of ball bearing assembly 65. Horizontal motion of X-stage slider 16 is caused by the eccentricity or "throw" of cam 62 and the maximum limits of travel of the slider are a function of this eccentricity. The absolute position of slider 16 with respect to a fixed point, such as the axial centerline of mounting aperture 13, may be adjusted by turning screw 28.

Springs 55 co-acting with paired spring hangers 31 (on Y-stage slider 17) and spring hangers 43 (on baseway 19), similarly, produce a horizontal force component which keeps the head of Y-stage adjusting screw 33 in contact with the outer raceway of bearing assembly 74, and a vertical component which tensions slider 17 against baseway 19. Motion of the second stage operating handle 66, in a horizontal plane, imparts rotary motion to second stage bushing 57 and, in turn, to second stage eccentric cam 71 which is located within bore 30. The outer raceway of bearing assembly 74, which surrounds cam 71, is always urged into non-rotating positive contact with the head of adjusting screw 33 by springs 55 and, as the cam rotates, horizontal motion is imparted to second stage slider 17. Horizontal motion of operating handles 60 and 66 which, as shown in FIG. 3, are both located within baseway support 20, is limited by stop faces 47.

Friction between sliders 16 and 17 is reduced to a minimum by the combination of ball bearings 54 and the grooves 25, 35 and 36. The unique construction of separators 51 and retaining pins 37 keeps the bearings in a relatively fixed, predetermined position. Friction between second stage slider 17 and baseway 19 is minimized in a similar fashion.

To use the device it is only necessary to move slider plate 78, using knob 77, across surface 14 in any desired direction. This may be done with one hand. By appropriate choice of connecting rod and operating handle lengths vis-a-vis the eccentricity of the cams, it is possible to achieve a large ratio (e.g. 40:1, 100:1, etc.) of slider plate motion to work table motion along an X axis, a Y axis or combinations of both. Thus, large movements of slider plate 78 produce small directly proportional movements of work table 18 in exactly the same direction. These movements may be purely along the X axis, purely along the Y axis or along vectors which have both X and Y components. The device is thus suited to achieve the objects first stated.

Although the invention has been described in considerable detail, such description is intended to be illustrative rather than limiting, since the invention may be variously embodied and its extent, consequently, is to be determined by the appended claims.

Having described our invention, we claim:

1. A multi-stage micropositioner comprising, a base; a first-stage slider, having a vertical internal bore, mounted on said base and capable only of reciprocal horizontal motion with respect thereto along a first linear axis; a second-stage slider, having a vertical internal bore, mounted on said first-stage slider and capable only of reciprocal horizontal motion with respect thereto along a second linear axis angularly displaced from said first linear axis; a first-stage eccentric cam mounted horizontally within the bore of said first stage slider; linking means connecting the edge of said cam and the peripheral wall of said bore; a second-stage eccentric cam mounted horizontally within the bore of said second-stage slider; linking means connecting the edge of said second-stage cam and the peripheral wall of said bore; pantograph operating means remote from said slider; and rotating proportional means connected to said pantograph means and said eccentric cams for transmitting the motion of said pantograph to said cams and, in turn, to said sliders.

2. The multi-stage micropositioner of claim 1 wherein, further, the linking means between the edges of said cams and the peripheral walls of said bores are identical and each comprises a screw mounted in a slider protruding radially into said bore, and resilient means urging the terminal end of said screw into juxtaposition with the edge of the cam which is within said bore.

3. The multi-stage micropositioner of claim 2 wherein, further, each cam includes annular friction reducing means mounted on its periphery and the terminal end of said screw is in adjustable sliding juxtaposition with the periphery of said annular friction reducing means.

4. The multi-stage micropositioner of claim 3 which further includes friction reducing means between said base and said first-stage slider and between said first-stage slider and said second-stage slider.

5. A micropositioner including a generally rectangular main base having a smooth horizontal portion and a mounting aperture; a dowel pin mounted vertically in said aperture; a first-stage sleeve mounted concentrically on said dowel pin; a first-stage operating handle mounted on the lower end of said first-stage sleeve and extending radially outward therefrom; a first-stage eccentric cam mounted horizontally on the upper end of said first-stage sleeve; a second-stage sleeve mounted concentrically on said first-stage sleeve intermediate said first-stage operating handle and said first-stage eccentric cam; a second-stage operating handle mounted on the lower end of said second-stage sleeve and extending radially outward therefrom; a second-stage eccentric cam mounted horizontally on the upper end of said second-stage sleeve; a first-stage connecting rod; a second-stage connecting rod; an operating knob assembly; each of said rods having one end pivotally connected to said knob assembly and their other end pivotally attached to the outward end of the operating handle bearing the same stage designation; said knob assembly further including a slider plate in fact to face planar juxtaposition with said smooth horizontal portion of said main base; a baseway support mounted on said main base which baseway support vertically encompasses said operating handles and includes an open portion adapted to permit said operating handles to protrude therethrough and describe limited arcuate paths; a baseway mounted on said baseway support, said baseway including an internal bore larger in diameter than the outside diameter of said second-stage sleeve; a second-stage slider slideably mounted on said baseway and vertically encompassing said second-stage eccentric cam; said second-stage slider being capable only of reciprocal horizontal motion along a first linear axis, said second-stage slider further including an internal bore adapted to receive said second-stage eccentric cam; linking means for transmitting the throw of said second-stage cam to said second-stage slider; a first-stage slider slideably mounted on said second-stage slider and vertically encompassing said first-stage eccentric cam, said first-stage slider being capable only of reciprocal horizontal motion along a second linear axis angularly displaced from said first linear axis, said first-stage slider including an internal bore adapted to receive said first-stage eccentric cam; linking means for transmitting the throw of said first-stage cam to said first-stage slider; and a work table mounted on said first-stage slider; a movement of said knob producing proportional movement of said work table.

6. The micropositioner of claim 5 which further indicates friction reducing means located between said baseway and said second-stage slider and also between said second-stage slider and said first-stage slider.

7. The micropositioner of claim 5 wherein, further, each eccentric cam has an annular anti-friction bearing assembly mounted thereon and the linking means for transmission of cam throw to slider, in each instance, includes a screw adjustably mounted in a slider protruding radially in a horizontal plane toward the axial center of said slider's bore and resilient means urging the terminal end of said screw into sliding juxtaposition with the periphery of said annular anti-friction bearing assembly.

8. The micropositioner of claim 7 which further includes friction reducing means located between said baseway and said second-stage slider and also between said second-stage slider and said first-stage slider.

References Cited in the file of this patent

UNITED STATES PATENTS

| | | |
|---|---|---|
| 2,469,365 | Braaten | May 10, 1949 |
| 2,760,405 | Frischmann | Aug. 28, 1956 |
| 2,815,697 | Saunders-Singer | Dec. 10, 1957 |
| 2,940,357 | Oswold | June 14, 1960 |